(12) United States Patent
Smythe et al.

(10) Patent No.: US 10,559,308 B2
(45) Date of Patent: Feb. 11, 2020

(54) SYSTEM FOR DETERMINING USER INTENT FROM TEXT

(71) Applicant: SAS Institute Inc., Cary, NC (US)

(72) Inventors: Jared Michael Dean Smythe, Cary, NC (US); David Blake Styles, Raleigh, NC (US); Richard Welland Crowell, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 16/434,210

(22) Filed: Jun. 7, 2019

(65) Prior Publication Data

US 2019/0385611 A1    Dec. 19, 2019

Related U.S. Application Data

(60) Provisional application No. 62/686,651, filed on Jun. 18, 2018.

(51) Int. Cl.
*G06F 17/20* (2006.01)
*G10L 15/26* (2006.01)
(Continued)

(52) U.S. Cl.
CPC .......... *G10L 15/26* (2013.01); *G06F 17/2785* (2013.01); *G06F 17/28* (2013.01); *G06N 20/00* (2019.01); *G10L 15/197* (2013.01)

(58) Field of Classification Search
CPC ......... G10L 15/26; G10L 15/00; G10L 15/08; G10L 15/14; G10L 15/144; G10L 15/18; G06F 17/20; G06F 17/21; G06F 17/218; G06F 17/2241; G06F 17/2247; G06F 17/2264; G06F 17/227; G06F 17/2276; G06F 17/27; G06F 17/2705; G06F 17/271; G06F 17/2715; G06F 17/2735; G06F 17/274; G06F 17/2755; G06F 17/2765; G06F 17/277; G06F 17/2775; G06F 17/278; G06F 17/279
(Continued)

(56) References Cited

U.S. PATENT DOCUMENTS 10,331,402 B1 *    6/2019    Spector .................. G06F 3/167
10,332,508 B1 *    6/2019    Hoffmeister ............ G10L 15/16
(Continued)

OTHER PUBLICATIONS

Rabiner, L. R., & Huang, B. H., Fundamentals of speech recognition. Englewood Cliffs, NJ: Prentice Hall., 1993, Chapter 8, pp. 434-481.
(Continued)

*Primary Examiner* — Qi Han
(74) *Attorney, Agent, or Firm* — Bell & Manning, LLC

(57) ABSTRACT

A system determines user intent from text. A conversation element is received. An intent is determined by matching a domain independent relationship and a domain dependent term determined from the received conversation element to an intent included in an intent database that stores a plurality of intents and by inputting the matched intent into a trained classifier that computes a likelihood that the matched intent is the intent of the received conversation element. An action is determined based on the determined intent. A response to the received conversation element is generated based on the determined action and output.

30 Claims, 11 Drawing Sheets

(51) Int. Cl.
*G10L 15/197* (2013.01)
*G06N 20/00* (2019.01)
*G06F 17/28* (2006.01)
*G06F 17/27* (2006.01)

(58) Field of Classification Search
USPC ....... 704/235, 231, 243, 247, 251, 250, 255, 704/257, 275, 9
See application file for complete search history.

(56) References Cited

U.S. PATENT DOCUMENTS

| | | | |
|---|---|---|---|
| 2006/0074670 A1* | 4/2006 | Weng | G10L 15/22 704/257 |
| 2017/0177715 A1* | 6/2017 | Chang | G06F 17/2785 |
| 2018/0032884 A1* | 2/2018 | Murugeshan | G06N 5/04 |
| 2018/0060304 A1 | 3/2018 | Bull et al. | |

OTHER PUBLICATIONS

Allen, J. (1995) Natural language understanding. Redwood City, CA: The Benjamin Cummings, Chapter 1, pp. 1-18; Chapter 15, pp. 465-499, Chapter 16, pp. 503-537 and Chapter 17.8, pp. 564-567.
McTear, M. F. (2004). Spoken dialogue technology. Toward the conversational user interface. Springer. http://dx.doi.org/10.1007/978-0-85729-414-2, pp. 341-348.
Baptist, L., & Seneff, S. (2000). GENESIS-II: A versatile system for language generation in conversational system applications. Proceedings of the 6th International Conference on Spoken Language Processing (ICSLP '00), 3, 271-274.
Dutoit, T. (1996). An introduction to Text-to-Speech synthesis. Dordrecht: Kluwer Academic, pp. 145-155.

* cited by examiner

SYSTEM FOR DETERMINING USER INTENT FROM TEXT

CROSS-REFERENCE TO RELATED APPLICATIONS

The present application claims the benefit of and priority to 35 U.S.C. § 119(e) to U.S. Provisional Patent Application No. 62/686,651 filed on Jun. 18, 2018, the entire contents of which are hereby incorporated by reference.

SUMMARY

In an example embodiment, a non-transitory computer-readable medium is provided having stored thereon computer-readable instructions that, when executed by a computing device, cause the computing device to determine user intent from text. A conversation element is received. An intent is determined by matching a domain independent relationship and a domain dependent term determined from the received conversation element to an intent included in an intent database that stores a plurality of intents and by inputting the matched intent into a trained classifier that computes a likelihood that the matched intent is the intent of the received conversation element. An action is determined based on the determined intent. A response to the received conversation element is generated based on the determined action and output.

In another example embodiment, a computing device is provided. The computing device includes, but is not limited to, a processor and a non-transitory computer-readable medium operably coupled to the processor. The non-transitory computer-readable medium has instructions stored thereon that, when executed by the computing device, cause the computing device to determine user intent from text.

In yet another example embodiment, a method of determining user intent from text is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
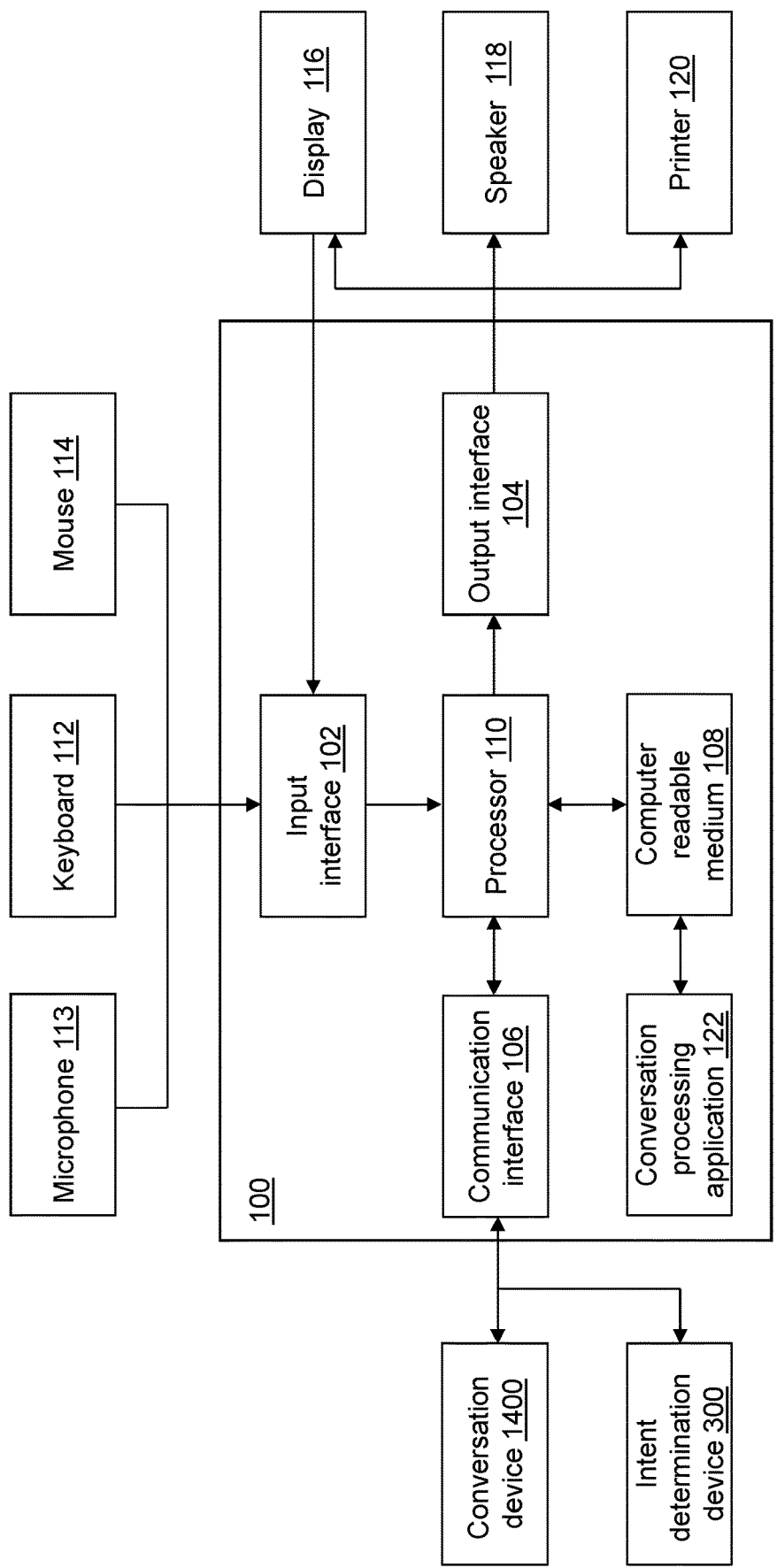
FIG. 1 depicts a block diagram of a conversation processing device in accordance with an illustrative embodiment.

Referring to FIG. 1, a block diagram of a conversation processing device 100 is shown in accordance with an illustrative embodiment. Conversation processing device 100 may include an input interface 102, an output interface 104, a communication interface 106, a non-transitory computer-readable medium 108, a processor 110, and a conversation processing application 122. Fewer, different, and/or additional components may be incorporated into conversation processing device 100.

Conversation processing device 100 may receive a conversation element from a conversation device 1400 (shown referring to FIG. 14), determine a response to the conversation element, and send the determined response to conversation device 1400. As understood by a person of skill in the art, intent identification and the associated slot filling of an identified intent are critical subtasks of natural language understanding (NLU) of conversation elements. NLU is a branch of artificial intelligence that helps computers understand, interpret, and manipulate human language. NLU draws from many disciplines, including computer science and computational linguistics to support human communication with computers. NLU goes beyond a structural understanding of language to interpret intent, resolve context and word ambiguity, and generate well-formed human language. NLU algorithms tackle the complex problem of semantic interpretation—that is, understanding the intended meaning of spoken or written language, with all the subtleties, context, and inferences that humans are able to comprehend.

Existing conversation processing devices perform intent identification and the associated slot filling using either handwritten domain ontologies and semantic grammars, classifiers using sentence-to-slot labels, sentence-to-filler labels, and sentence-to-intent labels, or sequence models (e.g., recurrent neural network) using sentence-to-filled-slot labels. Unlike existing conversation processing devices, conversation processing device 100 provides a unique hybrid rule-based and machine learning system that performs intent identification and slot filling based on ranked semantic relationships. Semantic relationships aid the conversation or dialogue processing system in choosing the best slots and fillers for a given conversation element (question, command, comment, statement, etc.). The hybrid system applies expert knowledge, such as rules written by a linguist or domain expert, in combination with machine-learned rules, which allows the system to be tailored to better fit performance requirements such as accuracy, precision, and/or recall for a target domain. For example, when applied to a financial domain, a key metric may be precision, but when applied to a public domain, a key metric may be overall recall. In some domains, it is acceptable to have occasional false positives in exchange for enhanced coverage. For example, when using a voice recognition system to look up names of actors occasional false positives is acceptable. In other domains, precision is critical. For example, when using the voice recognition system to call 911. With a hybrid approach, conversation processing device 100 can be tuned to the level of precision desired through the addition/removal of rules written by a linguist.

Input interface 102 provides an interface for receiving information from the user or another device for entry into conversation processing device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into conversation processing device 100 or to make selections presented in a user interface displayed on display 116.

The same interface may support both input interface 102 and output interface 104. For example, display 116 comprising a touch screen provides a mechanism for user input and for presentation of output to the user. Conversation processing device 100 may have one or more input interfaces that use the same or a different input interface technology. The input interface technology further may be accessible by conversation processing device 100 through communication interface 106.

Output interface 104 provides an interface for outputting information for review by a user of conversation processing device 100 and/or for use by another application or device. For example, output interface 104 may interface with various output technologies including, but not limited to, display 116, a speaker 118, a printer 120, etc. Conversation processing device 100 may have one or more output interfaces that use the same or a different output interface technology. The output interface technology further may be accessible by conversation processing device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Conversation processing device 100 may have one or more communication interfaces that use the same or a different communication interface technology. For example, conversation processing device 100 may support communication using an Ethernet port, a Bluetooth antenna, a telephone jack, a USB port, etc. Data and messages may be transferred between conversation processing device 100 and conversation device 1400 and/or an intent determination device 300 (shown referring to FIG. 3) using communication interface 106.

Non-transitory computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. conversation processing device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Conversation processing device 100 also may have one or more drives that support the loading of a memory media such as a CD, DVD, an external hard drive, etc. One or more external hard drives further may be connected to conversation processing device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Conversation processing device 100 may include a plurality of processors that use the same or a different processing technology.

Conversation processing application 122 performs operations associated with receiving the conversation element from conversation device 1400, determining the response to the conversation element based on an intent determination by intent determination device 300, and sending the determined response to conversation device 1400. The operations may be implemented using hardware, firmware, software, or any combination of these methods. Referring to the example embodiment of FIG. 1, conversation processing application 122 is implemented in software (comprised of computer-readable and/or computer-executable instructions) stored in computer-readable medium 108 and accessible by processor 110 for execution of the instructions that embody the operations of conversation processing application 122. Conversation processing application 122 may be written using one or more programming languages, assembly languages, scripting languages, etc. Conversation processing application 122 may be integrated with other analytic tools. As an example, conversation processing application 122 may be part of an integrated data analytics software application and/or software architecture such as that offered by SAS Institute Inc. of Cary, N.C., USA. For example, conversation processing application 122 may be integrated with one or more SAS software tools such as SAS® Enterprise Miner™, SAS® Visual Text Analytics, SAS® Visual Analytics, SAS® Contextual Analysis, Base SAS, SAS/STAR), SAS® High Performance Analytics Server, SAS® LASR™, SAS® In-Database Products, SAS® Viya™, SAS In-Memory Statistics for Hadoop®, SAS® Event Stream processing (ESP), SAS® Mobile BI, all of which are developed and provided by SAS Institute Inc. of Cary, N.C., USA. Data mining and data analytics is applicable in a wide variety of industries.

Conversation processing application 122 may be implemented as a Web application. For example, conversation processing application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Figure 2:
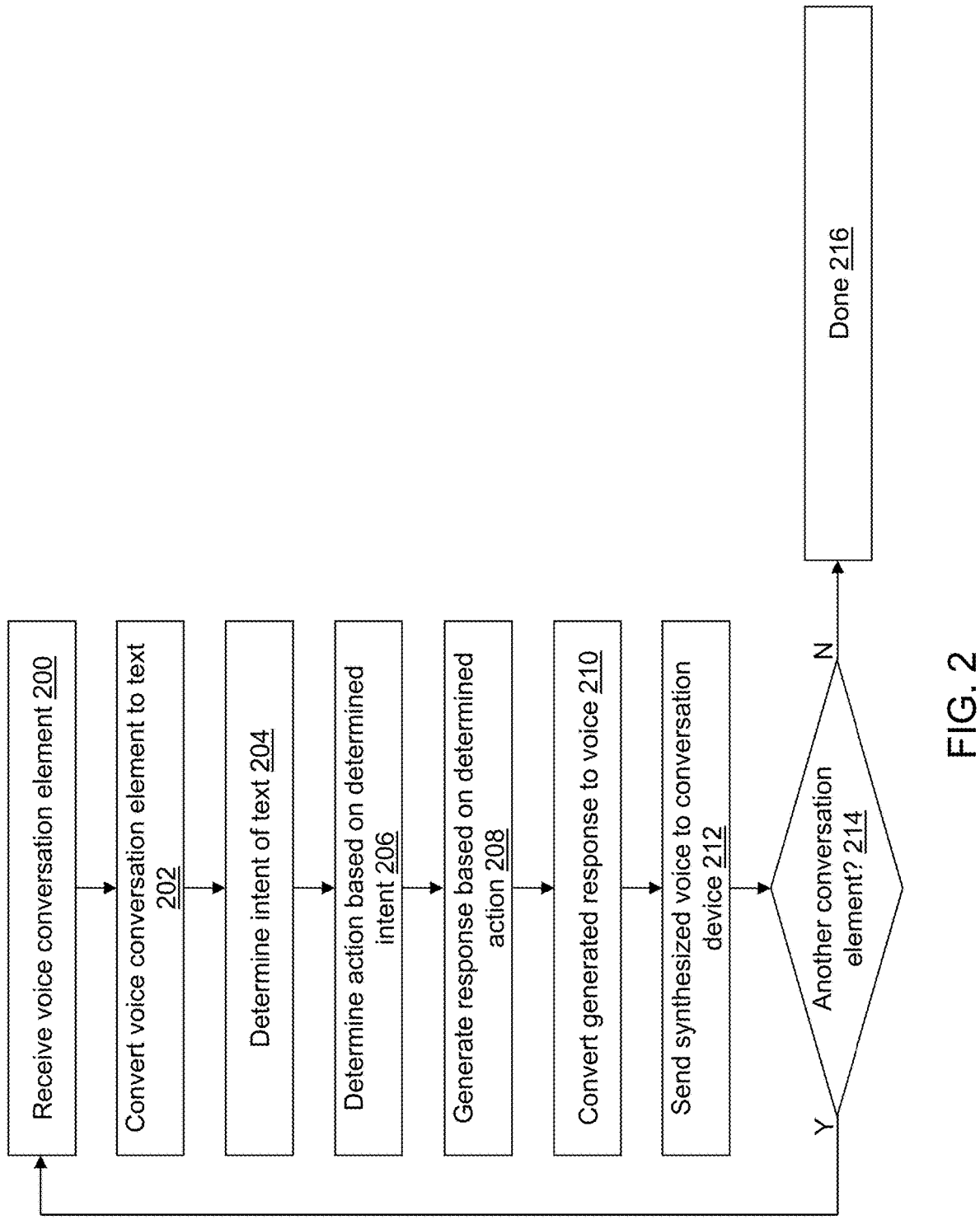
FIG. 2 depicts a flow diagram illustrating examples of operations performed by the conversation processing device of FIG. 1 in accordance with an illustrative embodiment.

Referring to FIG. 2, example operations associated with conversation processing application 122 are described. Additional, fewer, or different operations may be performed depending on the embodiment of conversation processing application 122. The order of presentation of the operations of FIG. 2 is not intended to be limiting. Although some of the operational flows are presented in sequence, the various operations may be performed in various repetitions, concurrently (in parallel, for example, using threads and/or a distributed computing system), and/or in other orders than those that are illustrated. For example, a user may execute or trigger execution of conversation processing application 122, which causes presentation of a first user interface window, which may include a plurality of menus and selectors such as drop-down menus, buttons, text boxes, hyperlinks, etc. associated with conversation processing application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by conversation processing application 122. For example, instead of receiving input through a user interface, the input may be read from a file stored on computer-readable medium 108 and/or on another computing system.

In an operation 200, a first indicator may be received that indicates a voice conversation element such as a question, command, statement, comment, etc. made to conversation device 1400. As an example, the first indicator may be received by conversation processing application 122 after receipt from microphone 113 through input interface 102 or from a second microphone 1413 (shown referring to FIG. 14) through a third input interface 1402 (shown referring to FIG. 14) of conversation device 1400 through communication interface 106 and a third communication interface 1406 (shown referring to FIG. 14) of conversation device 1400, etc.

In an operation 202, the received voice conversation element may be converted to text using voice recognition as understood by a person of skill in the art. In an alternative embodiment, text is received using the first indicator instead of voice, and no translation is performed. As an example, the first indicator including text may be received by conversation processing application 122 after selection from a user interface window of a third display 1416 (shown referring to FIG. 14) possibly also using a second keyboard 1412 (shown referring to FIG. 14), or a second mouse 1414 (shown referring to FIG. 14) of conversation device 1400 and through third input interface 1402, after entry by a user into the user interface window of conversation device 1400, and/or after being translated from voice to text by a third processor 1410 (shown referring to FIG. 14) of conversation device 1400 before sending the first indicator through third input interface 1402 and communication interface 106.

Figure 3:
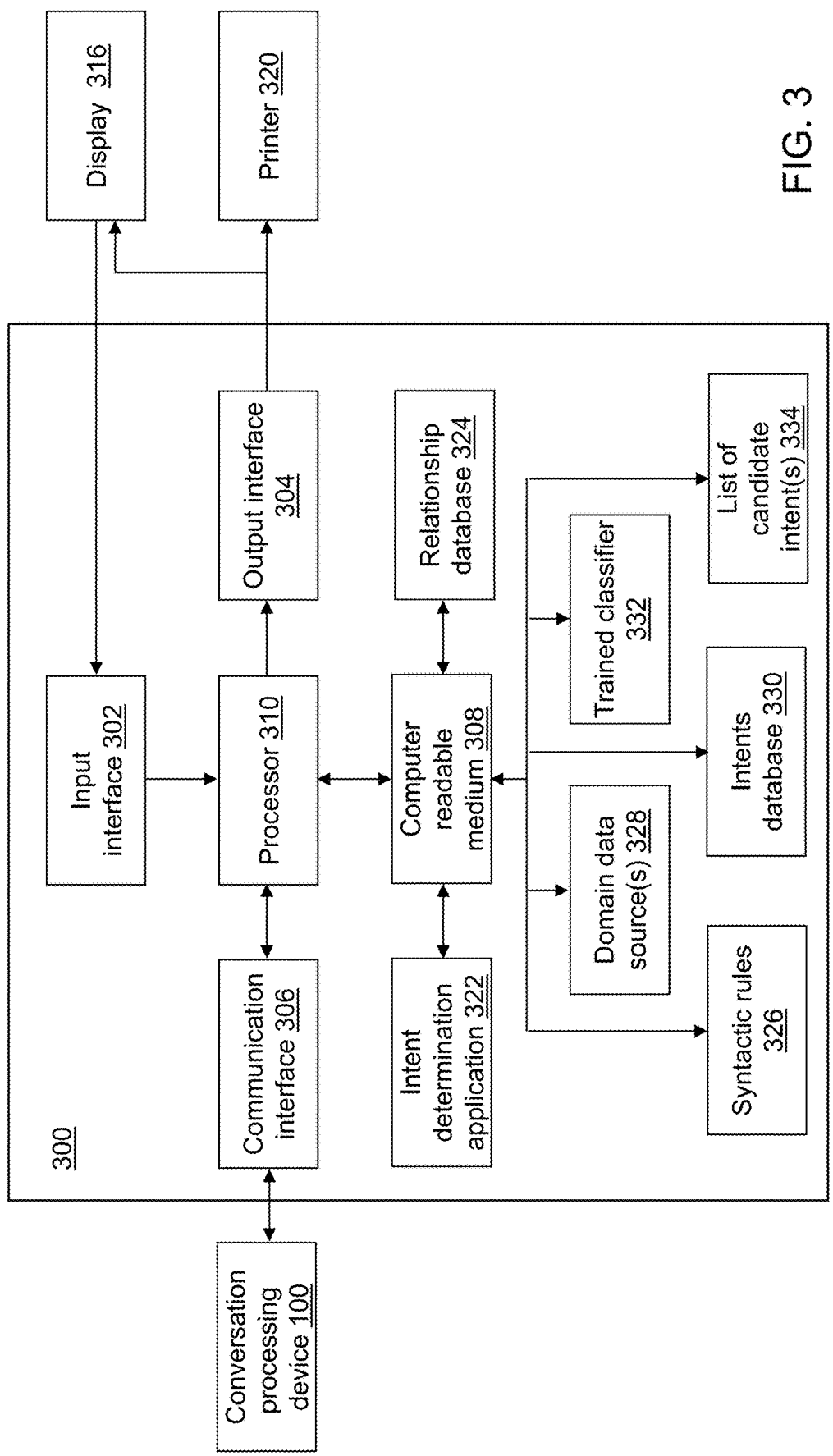
FIG. 3 depicts a block diagram of an intent determination device in accordance with an illustrative embodiment.

In an operation 204, an intent of the text is determined. For example, referring to FIG. 3, intent determination device 300 determines the intent of the text. Referring to FIG. 3, a block diagram of intent determination device 300 is shown in accordance with an example embodiment. Intent determination device 300 may include a second input interface 302, a second output interface 304, a second communication interface 306, a second non-transitory computer-readable medium 308, a second processor 310, an intent determination application 322, a relationship database 324, syntactic rules 326, domain data source(s) 328, an intents database 330, a trained classifier 332, and a list of candidate intents 334. Fewer, different, and additional components may be incorporated into intent determination device 300.

Second input interface 302 provides the same or similar functionality as that described with reference to input interface 102 of conversation processing device 100 though referring to intent determination device 300. Second output interface 304 provides the same or similar functionality as that described with reference to output interface 104 of conversation processing device 100 though referring to intent determination device 300. Second communication interface 306 provides the same or similar functionality as that described with reference to communication interface 106 of conversation processing device 100 though referring to intent determination device 300. Data and messages may be transferred between intent determination device 300 and conversation processing device 100 using second communication interface 306. Second computer-readable medium 308 provides the same or similar functionality as that described with reference to computer-readable medium 108 of conversation processing device 100 though referring to intent determination device 300. Second processor 310 provides the same or similar functionality as that described with reference to processor 110 of conversation processing device 100 though referring to intent determination device 300.

Intent determination application 322 performs operations associated with determining the intent of the text. Modern task-based dialog systems are based on a domain ontology, a knowledge structure that represents the kinds of intentions the system can extract from user sentences. The ontology defines one or more frames, each a collection of slots, and defines the values (fillers) that each slot can take. The frame is a set of relations between objects, events, and concepts. For example, in the sentence: "John bought an apple from Sally", the frame could be named "selling an item". The frame could contain the following relations, events, and concepts:

The buyer (John)
The seller (Sally)
The product (an apple)
The buyer bought something (john bought an apple)

The seller sold something (sally sold an apple)
The buyer bought from the seller (John bought from sally).

The role of frame-based natural language understanding is to identify the intent and fill the slots associated with one or more of the intent's frames. Intent determination application 322 applies a new approach to determining intents and filling slots using semantic relationships, extensible domain term matching, and a trained classifier and does not use frames. The operations may be implemented using hardware, firmware, software, or any combination of these methods. Referring to the example embodiment of FIG. 3, intent determination application 322 is implemented in software (comprised of computer-readable and/or computer-executable instructions) stored in second computer-readable medium 308 and accessible by second processor 310 for execution of the instructions that embody the operations of intent determination application 322. Intent determination application 322 may be written using one or more programming languages, assembly languages, scripting languages, etc. Intent determination application 322 may be implemented as a Web application.

Figure 4:
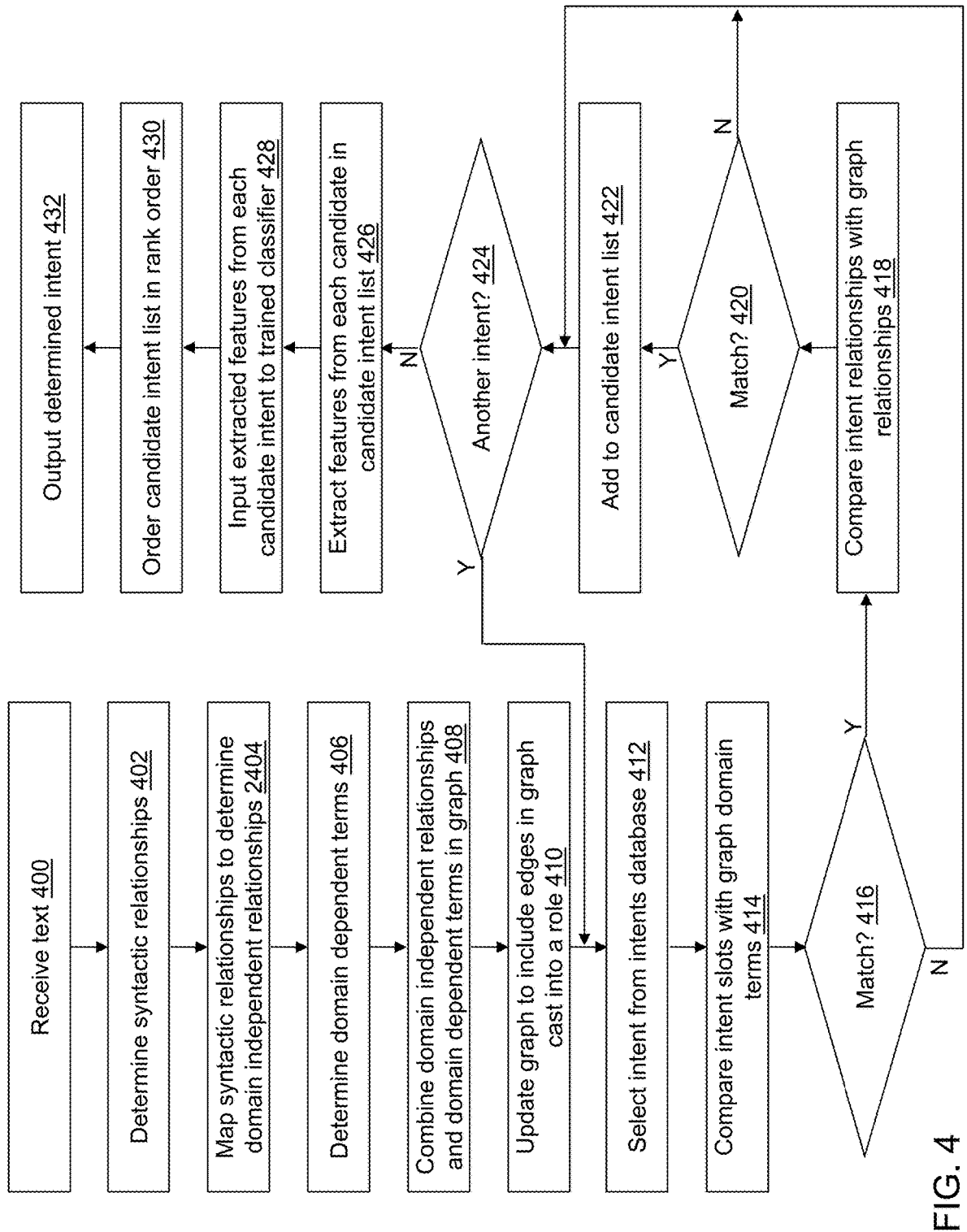
FIG. 4 depicts a flow diagram illustrating examples of operations performed by the intent determination device of FIG. 3 in accordance with an illustrative embodiment.

Referring to FIG. 4, example operations associated with intent determination application 322 are described. Additional, fewer, or different operations may be performed depending on the embodiment. The order of presentation of the operations of FIG. 4 is not intended to be limiting. Although some of the operational flows are presented in sequence, the various operations may be performed in various repetitions, concurrently, and/or in other orders than those that are illustrated. As further understood by a person of skill in the art, various operations may be performed in parallel, for example, using a plurality of threads or a plurality of computing devices such as a grid or a cloud of computing devices.

In an operation 400, the text is received from conversation processing device 100. For example, the text may be received in a calling argument.

In an operation 402, syntactic relationships are determined from the text. Dependency or a relationship is a notion that linguistic units (words) are connected to each other by directed links. A type of dependency may be syntactic. A dependency parser accepts the text as input and assigns a syntactic structure to the words as an output. Open source versions of a dependency parser are available such as the Natural Language Processing for JVM languages (NLP4J) Toolkit provided by Emory NLP.

For example, the sentence "John Doe flew to Target" may be parsed to determine the syntactic relationships as shown in the following:

```
John Doe flew to Target {
    ROOT -> flew(VBD)[fly]-2{9,13}
        NSUBJ -> Doe(NNP)[doe]-1{5,8}
            COMPOUND -> John(NNP)[john]-0{0,4}
        PREP -> to(IN)[to]-3{14,16}
            POBJ -> Target(NNP)[target]-4{17,23}
}
```

For illustration, in the line NSUBJ→Doe(NNP)[doe]-1{5,8}, NSUBJ is the dependency label. Doe is the surface form of the word, where the surface form is the actual word from the text. NNP is a part-of-speech tag as defined by the Penn Treebank Project part-of-speech tags provided by the University of Pennsylvania. "doe" is the lemma form (or dictionary form) of the word. "1" is the word index, which is the order in which the word appears in the sentence. The word index is zero based so the first word has word index "0". "9,13" are the character indexes for the first and last letters of the word.

Semantic relationships define the meaning of text. Syntactic relationships define the structure of the text. Syntactic rules 326 take one or more syntactic relationships as input and output zero or more semantic relationships. The dependency parse represents syntactic dependencies. Semantic relationships can be domain independent or domain dependent. In an operation 404, the determined syntactic relationships are mapped to determine domain independent relationships using relationship database 324 and syntactic rules 326. Often, semantic dependencies overlap with and point in the same direction as syntactic dependencies. Domain independent relationships are common to all target domains and may be stored in relationship database 324. Syntactic rules 326 can be created by an expert such as a linguist or may be statistically derived. For example, a set of expert defined rules and statistical rules that map common syntactic dependency patterns into simplified semantic dependencies may be included in syntactic rules 326. The rules included in syntactic rules 326 may be expressed as predicates and their arguments. An argument is an expression that helps complete the meaning of a predicate that is a main verb and its auxiliaries. Semantic relationships are associations that exist between the meanings of words. For example: "John threw the ball to Mary" may represent a semantic relationship such as throw(person, object, person) that may be filled as throw (John, ball, Mary). As another example, "John threw the ball" and "The ball was thrown by John" are two sentences that have the same semantic relationship between John and the ball, but the syntactic structures are different.

Figure 5:
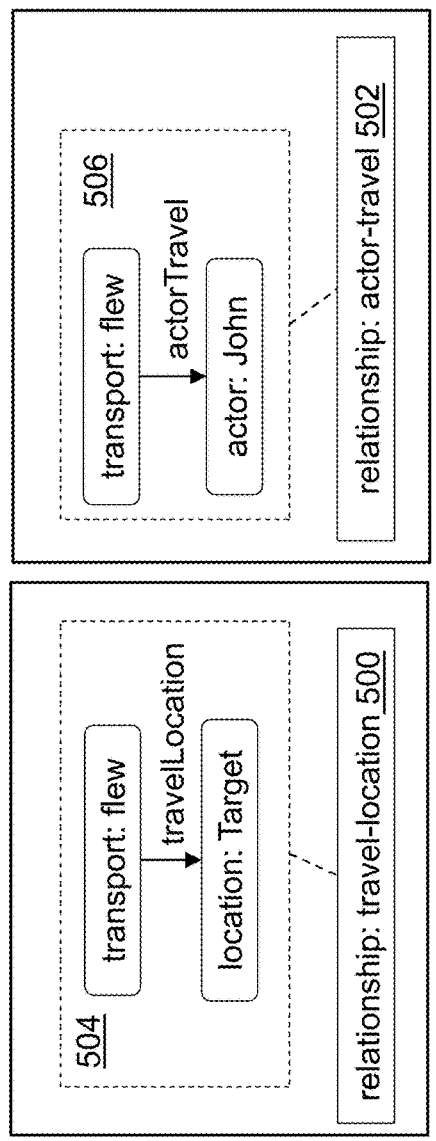
FIG. 5 depicts domain independent relationships included in a relationship database in accordance with an illustrative embodiment.

For example, referring to FIG. 5, the sentence "John Doe flew to Target" may result in a first semantic relationship 500 and a second semantic relationship 502. First semantic relationship 500 may be defined as travel-location and may have been identified from a first semantic parse 504 that includes "transport:flew" mapped to "location:Target" by travelLocation. Second semantic relationship 502 is defined as actor-travel and may have been identified from a second semantic parse 506 that includes "transport:flew" mapped to "actor:John" by actorTravel. These are domain independent semantic relationships. Each relationship represents a grouping of text and how they are related by meaning. For example, Looking at 504 . . . , "flew" implies a means of travel (or transport) and "Target" is the name of a store (or location). The syntactical organization in the sentence (John flew to Target) implies the two words are related by the rule TravelLocation. Combining all three together, results in a detected relationship: travel-location.

In an operation 406, domain dependent terms are determined using domain data source(s) 328 by submitting a conversation element to domain data source(s) 328 that includes the terms includes in the text and identifying matching domain terms to perform named entity recognition (NER). Domain terms are words mapped to classes in the context of a given domain. For example: "Apple" is a computer company in the domain of software. "Apple" is a domain term with the class "company" in the domain of "software". Domain term matching is the process of associating words in the text to domain term classes. For example, various matching methods may be used such as exact text matching, statistical entity recognition, cosine similarity, cluster analysis, etc. The matching method may over match in an attempt to provide high recall. A flexible domain term matching system provides access to domain data source(s) 328 that may include customer-specific databases such as a database of employee names. There are many approaches to solving the NER problem with varying success, which is why intent determination application 322 supports the use of multiple NER algorithms. Different algorithms choose different spans of text to represent a given entity. Intent determination application 322 creates candidates for all of the detected entities. The "best" candidates are selected as "correct" based on further processing described below.

A domain term identifies linguistic unit (word) as being a member in a given domain. For example, in the domain of 'food' an 'apple' is a 'fruit'; whereas, in the domain of 'software', 'apple' is a software company. Domain term matching is a process of mapping one or more linguistic units to a given domain. An aggregation of multiple matching methods may be used to determine domain dependent terms using domain data source(s) 328 such as cosine similarity, regular expression matching, application of an ontology such as wordNet, etc.

Figure 6:
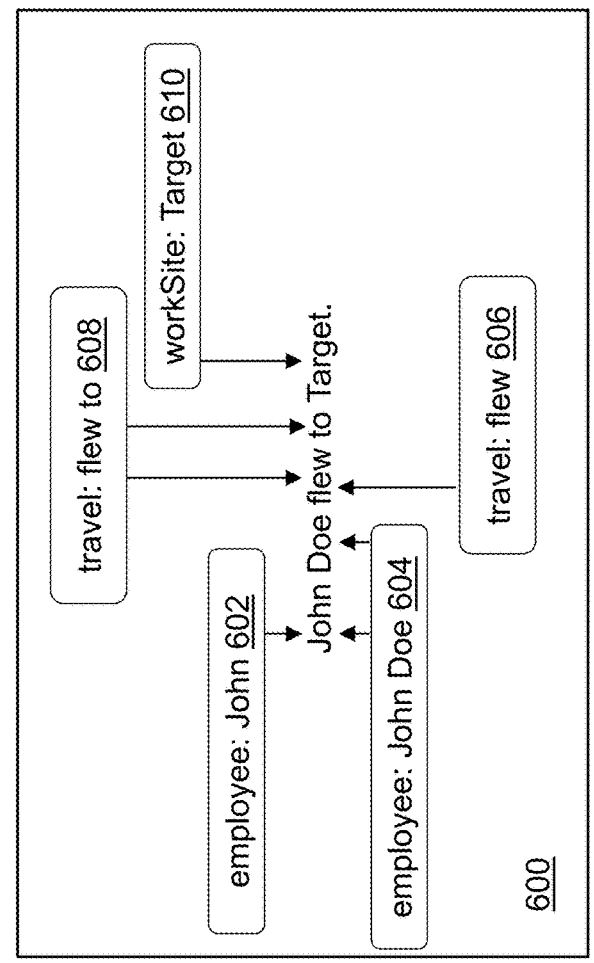
FIG. 6 depicts domain dependent terms extracted from the conversation element in accordance with an illustrative embodiment.

For example, referring to FIG. 6, domain dependent terms 600 extracted from the sentence "John Doe flew to Target" are depicted in accordance with an illustrative embodiment. Domain dependent terms 600 include a first domain term 602, a second domain term 604, a third domain term 606, a fourth domain term 608, and a fifth domain term 610. First domain term 602 includes a domain dependent pair "employee: John". Second domain term 604 includes a domain dependent pair "employee: John Doe". Third domain term 606 includes a domain dependent pair "travel: flew". Fourth domain term 608 includes a domain dependent pair "travel: flew to". Fifth domain term 610 includes a domain dependent pair "workSite: Target".

Data sources are curated by developers who wish to extend the natural language understanding matching system. For example, the NLU system was extended to enable matching on names of US cities by creating a searchable index of US city names using elastic search, which is a searchable index and a domain dependent data source.

In an operation 408, the determined domain independent relationships and the determined domain dependent terms are combined to create a graph. Independent relationships are defined over single words while terms are defined over multiple words. The graph represents both in a single unified graph. The graph represents all possible domain-dependent semantic relationships. Unlike the domain independent graph, each node in the single unified graph is a pairing of a text span and a possible domain term interpretation of the text. The same text span may appear multiple times in the same graph because any given text span may have multiple possible interpretations. (e.g. apple may be a fruit or a software company). The edges from the domain independent graph are superimposed onto the text spans in the single unified graph. This process implies that any single domain independent edge may become one or more edges in the single unified graph.

Figure 7:
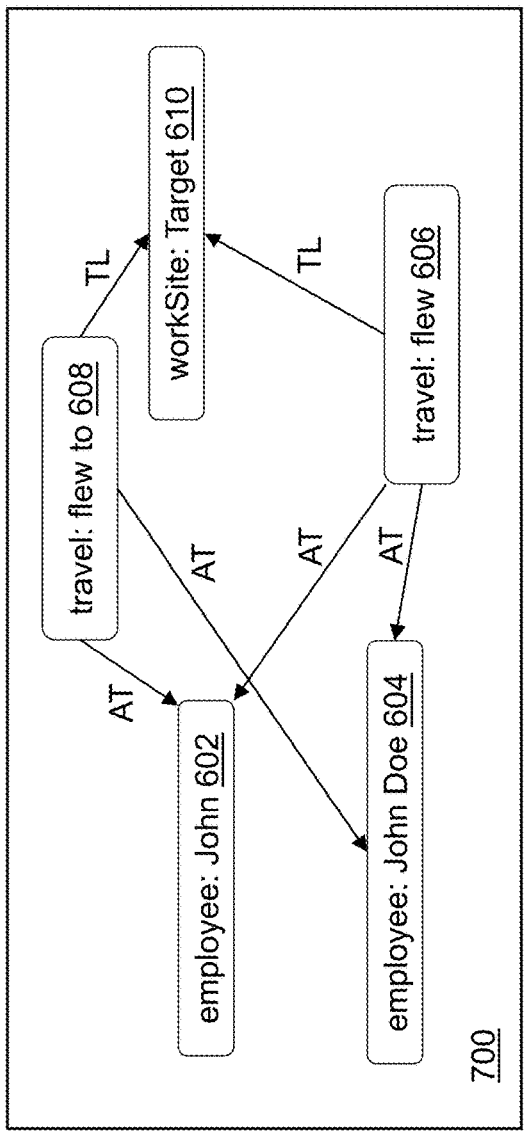
FIG. 7 depicts a connected relationship graph created from the domain independent relationships and the domain dependent terms extracted from the conversation element in accordance with an illustrative embodiment.

A domain term can be a label for multiple tokens, a single token or even a portion of a token. For example, referring to FIG. 7, a connected relationship graph 700 is created from the domain independent relationships and the domain dependent terms extracted from the sentence "John Doe flew to Target" in accordance with an illustrative embodiment. The edges connecting pairs of the determined domain dependent terms are defined by either the determined domain independent relationship "AT", which represents actorTravel or the determined domain independent relationship "TL", which represents travelLocation.

Figure 8:
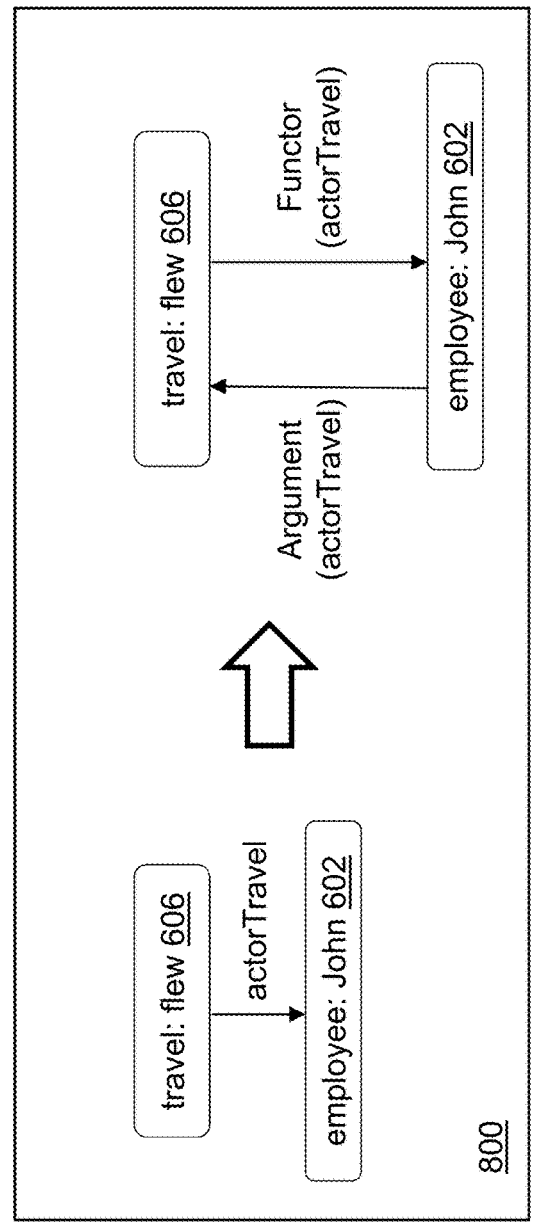
FIG. 8 depicts a role graph in accordance with an illustrative embodiment.

In an operation 410, the created graph is updated to include edges cast into a role. For example, referring to FIG. 8, a role graph 800 is shown in accordance with an illustrative embodiment to include an implied relationship between nodes cast into the roles of functor and argument. An argument directed edge connects first domain term 602 toward third domain term 606 as an argument of the actor-Travel determined domain independent relationship. A functor directed edge connects third domain term 606 toward first domain term 602 as a functor of the actorTravel determined domain independent relationship. For every directional edge, the edge is expanded to have an inverse edge in the opposite direction and the roles of functor and argument are reversed, which allows a 'two-way street' through the created graph. Traversal through the graph can now occur in either direction for the purposes of finding paths.

Figure 9:
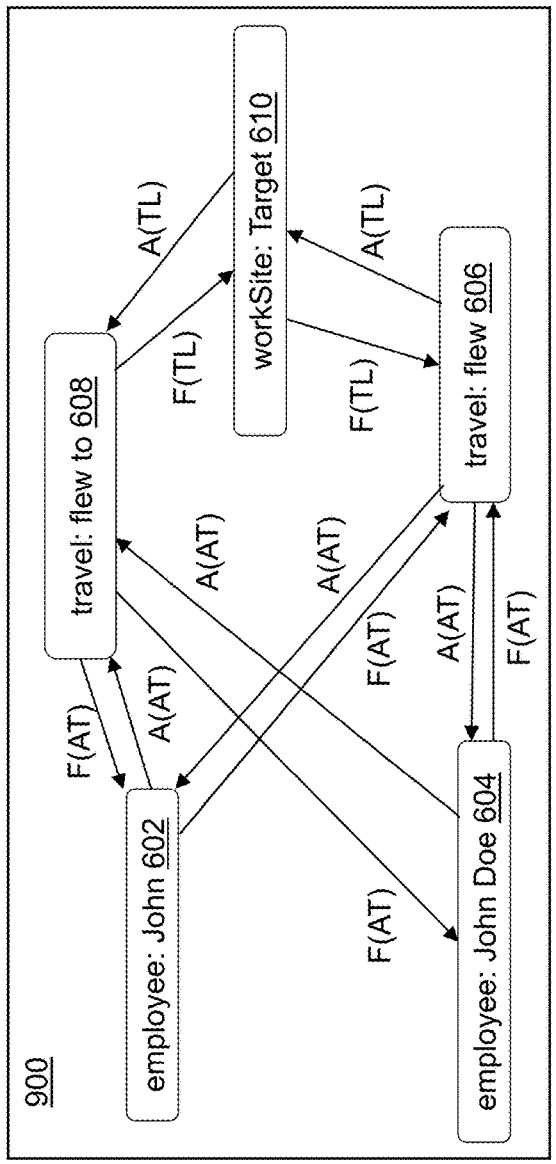
FIG. 9 depicts the connected relationship graph updated to include roles in accordance with an illustrative embodiment.

Referring to FIG. 9, an updated connected relationship graph 900 is shown that has been updated to include both argument and functor relationship directed edges to indicate the roles that relate the domain terms.

Figure 10:
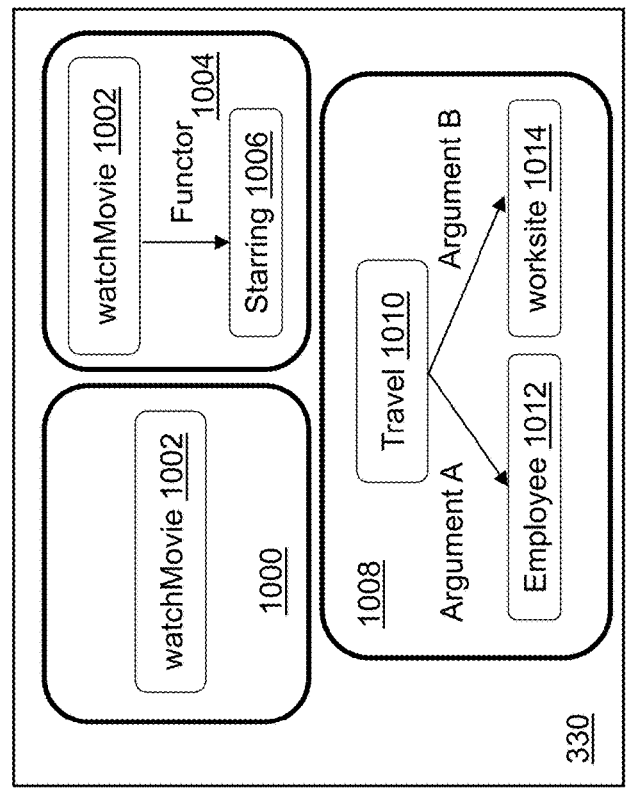
FIG. 10 depicts intent descriptions included in an intents database in accordance with an illustrative embodiment.

In an operation 412, a candidate intent is selected from intents database 330. For example, referring to FIG. 10, intent descriptions included in intents database 330 are shown in accordance with an illustrative embodiment. A designer defines the intents and slots that represent a type of language understood by intent determination application 322. In contrast to conventional approaches, the designer declares the intents and slots by defining them in the context of semantic relationships. Instead of using frames, slots, and fillers, the designer uses semantic relationships along with entity classes that can participate in the relationship.

For illustration, intents database 330 may include a first intent 1000 that includes a watchMovie slot 1002 and a second intent 1004 that includes watchMovie slot 1002 and a starring slot 1006 that are related by a functor as illustrated below:

```
// User wants to watch a named movie
// User wants to watch a movie starring a named actor
Intent watchMovie_request( ) {
    return or(watchMovie( ), starring(watchMovie));
}
Slot watchMovie = similarPhrasesTo("see a movie", "watch a film");
Slot starring = conversation elementDatabase("IMDB:Actors");
```

For illustration, intents database 330 may include a third intent 1008 that includes a travel slot 1010, an employee slot 1012, and a workSite slot 1014 that are related by an argument A and an argument B, respectively, as illustrated below:

```
// User would like an employee to travel to a work location
Intent travel_somewhere( ) {
    return travel(employee, workSite);
}
Slot travel = similarPhrasesTo("fly", "drive", "walk");
Slot employee = conversation elementDatabase("Employee Names");
Slot workSite = conversation elementDatabase("Work Locations");
```

Figure 11:
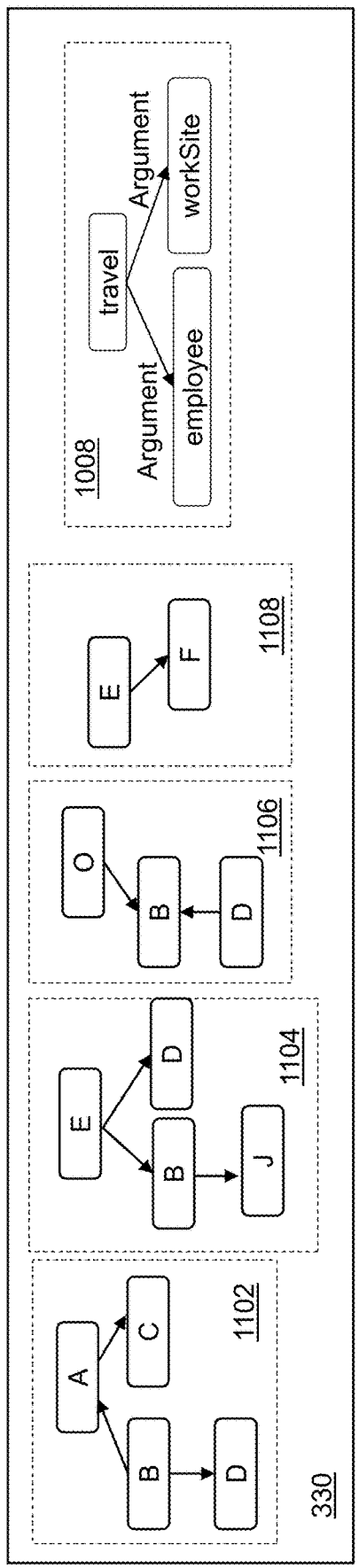
FIG. 11 depicts additional intent descriptions included in the intents database in accordance with an illustrative embodiment.

For example, referring to FIG. 11, additional generic intent descriptions included in intents database 330 are shown in accordance with an illustrative embodiment. The additional intent descriptions include a fourth intent 1102, a fifth intent 1104, a sixth intent 1106, and a seventh intent 1108 each with slots. Intents database 330 is predefined by defining domain terms and relationships of interest known as defining slots and intents. For illustration, intents database 330 is defined using a web-based user interface such as the Alexa chat builder.

In an operation 414, one or more slots of the selected candidate intent are compared with graph domain terms.

In an operation 416, a determination is made concerning whether or not there is a match between the one or more slots and the graph domain terms based on the comparison. When there is a match, processing continues in an operation 418. When there is not a match, processing continues in an operation 424.

Figure 12:
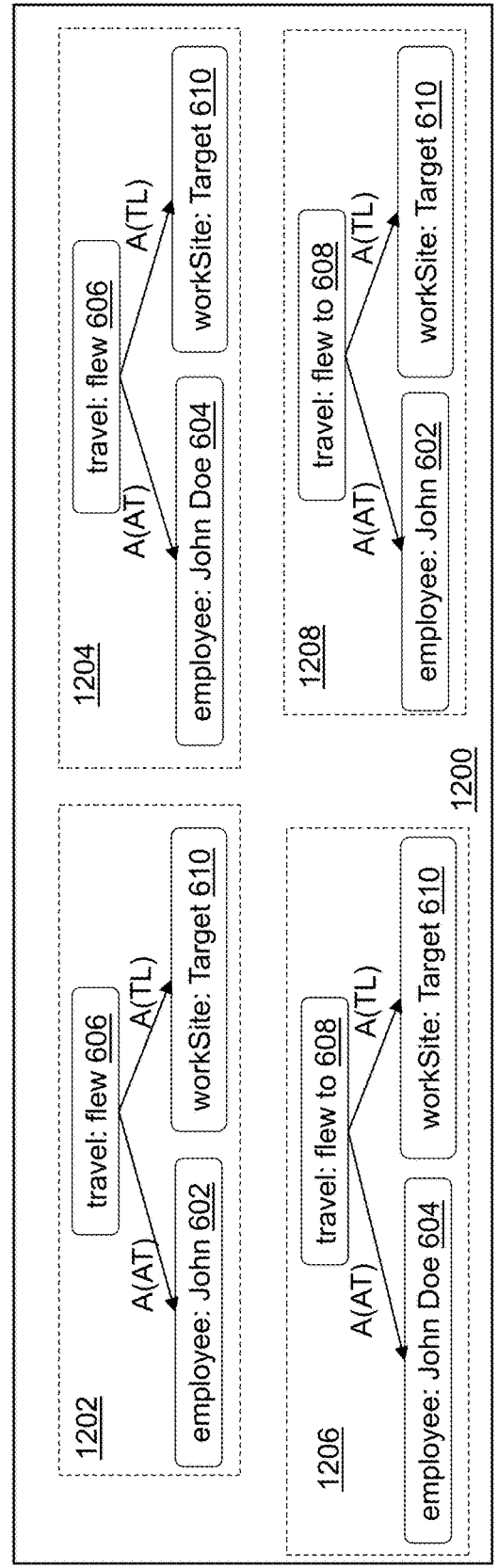
FIG. 12 depicts subgraphs of the connected relationship graph of FIG. 9 in accordance with an illustrative embodiment.

In operation 418, one or more intent relationships of the selected candidate intent are compared with graph relationships. The relationship comparison is between the directed edges of the selected intent and the directed edges of the graph along with the role (Functor/Argument) of the edges. For example, referring to FIG. 12, a plurality of subgraphs 1200 created from connected relationship graph 1000 may be compared with first intent 1008 and identified as a match in accordance with an illustrative embodiment. The plurality of subgraphs 1200 includes a first subgraph 1202, a second subgraph 1204, a third subgraph 1206, and a fourth subgraph 1208. Bead rules define subgraph matching criteria by defining edge requirements and/or node requirements (such as text label) that must exist to match a slot. The edge label is not constrained at this point. A subgraph in this context is the result of unifying the bead entry constraints with the nodes and edges from the graph that satisfy them.

In an operation 420, a determination is made concerning whether or not there is a match between the one or more intent relationships and the graph relationships based on the comparison. When there is a match, processing continues in an operation 422. When there is not a match, processing continues in operation 424. 422 The graphical structure of the intent, which includes the class of the node, the label of the edge, and the direction of the edges, is compared against the larger graph, which, at this point in the process, represents the input text transformed into a semantic graph. The graph is searched looking for nodes and edges that align exactly with an intent graph.

In operation 422, the selected candidate intent is added to the list of candidate intents 334.

In operation 424, a determination is made concerning whether or not there is another intent in intents database 330 to evaluate. When there is another intent, processing continues in operation 412 to evaluate the next intent as the selected intent. When there is not another intent, processing continues in an operation 426.

In operation 426, features are extracted from each candidate intent added to the list of candidate intents 334. Variations of co-location are used as features. For example: the co-location of verbs and intents. Additionally, features such as a total number of candidates, a number of edges in a candidate graph, values of edges in a candidate graph, etc. The features are used as a proxy, or a representation of, the candidate.

In an operation 428, the features extracted from each candidate intent are input to trained classifier 332 to compute a likelihood score for each candidate intent. Trained classifier 332 was previously trained to learn which candidate intents represent a best mapping of the input text to the defined semantic relationships. Trained classifier 332 is used to classify new candidates into one of two classes: correct or incorrect. Each candidate is also assigned a number which represents the likelihood of a candidate belonging to the assigned class. More specifically, trained classifier 332 was trained to learn which sets of domain terms and semantic edges best align with defined slots and intents. The likelihood score indicates a likelihood that the associated candidate intent is the intent associated with the text. For example, a feature based, statistical classification approach may be used such as a Random Forest statistical classifier though any feature based statistical classifier (e.g., linear regression, support vector machine, neural network, etc.) may be used to compute the likelihood score for each candidate intent.

In an operation 430, the list of candidate intents 334 is rank ordered based on the compute likelihood score for each candidate intent where a first intent included in the rank ordered list of candidate intents 334 has a highest computed likelihood score, where the highest computed likelihood score represents a most likely intent of the conversation element. In an alternative embodiment, a first intent included in the rank ordered list of candidate intents 334 has a lowest computed likelihood score, where the lowest computed likelihood score represents a most likely intent of the conversation element.

In an operation 432, the intent is determined from the rank ordered list of candidate intents 334 and is output. For example, the determined intent is the first intent included in the rank ordered list of candidate intents 334. The determined intent may be output by storing the determined intent in second computer-readable medium 308, by sending or by returning the determined intent to conversation processing application 122, or otherwise making the determined intent available to conversation processing application 122. The determined intent further may be output to second display 316 or a second printer 320. For example, a final semantic mapping for the sentence "John Doe flew to Target" may be second subgraph 1204: Intent=travel_somewhere with slots filled as travel=fly, employee=John Doe, and workSite=Target.

Though shown as a distinct device in the illustrative embodiment, intent determination device 300 and conversation processing device 100 may be the same device. Additionally, intent determination application 322 may be embedded in conversation processing application 122 or may be called by or otherwise integrated with conversation processing application 122, for example, using an application programming interface.

Referring again to FIG. 2, in an operation 206, an action is determined based on the determined intent, for example, as described in Dan Jurafsky and James H. Martin, *Speech and language processing: an introduction to natural language processing, computational linguistics, and speech recognition*, Pearson Prentice Hall, Upper Saddle River, N.J., Second edition, Ch. 9, 285-334 (2009); by Allen, J., Natural language understanding, Redwood City, Calif.: The Benjamin Cummings (1995); or by McTear, M. F., Spoken dialogue technology, Toward the conversational user interface, Springer (2004). A dialogue management engine may be embedded in conversation processing application 122 or may be called by or otherwise integrated with conversation processing application 122.

In an operation 208, a response is generated based on the determined action, for example, as described by Baptist, L., and Seneff, S., GENESIS-II: A versatile system for language generation in conversational system applications, Proceedings of the 6th International Conference on Spoken Language Processing (ICSLP '00), 3, 271-274 (2000). A natural language generation engine may be embedded in conversation processing application 122 or may be called by or otherwise integrated with conversation processing application 122.

In an operation 210, the generated response is converted to voice using a text to speech synthesizer, for example, as described in Dan Jurafsky and James H. Martin, *Speech and language processing: an introduction to natural language processing, computational linguistics, and speech recognition*, Pearson Prentice Hall, Upper Saddle River, N.J., Second edition, Ch. 8, 249-284 (2009).

In an operation 212, the synthesized voice is sent or returned to conversation device 1400. As an example, the synthesized voice may be sent by conversation processing application 122 through communication interface 106 and third communication interface 1406 conversation device 1400 for presentation by a second speaker 1418 (shown referring to FIG. 14). In an alternative embodiment, the generated response in text may be sent by conversation processing application 122 through communication interface 106 and third communication interface 1406 conversation device 1400 for presentation using third display 1416 instead of voice using second speaker 1418, and no conversion is performed.

In an operation 214, a determination is made concerning whether or not another conversation element is received. When another conversation element is received, processing continues in operation 200 to process the conversation element. When another conversation element is not received, processing continues in an operation 216. For example, conversation processing application 122 may use a timer to wait for receipt of another conversation element. If no conversation element is received before the timer expires, conversation processing application 122 may automatically determine that another conversation element is not received. As another option, execution of conversation processing application 122 may be stopped under control of a user.

In an operation 216, conversation processing is done.

Existing systems decide very early in the process on the "correct" components for interpreting a sentence. The ambiguity is resolved very early. Conversation processing device 100 carries ambiguity forward throughout the interpretation process until the very last step allowing conversation processing device 100 to evaluate multiple candidate interpretations without prematurely excluding an interpretation that may have been correct. Not throwing out low probability ambiguity early in the process results in a system with a larger search space for possible answers.

Figure 13:
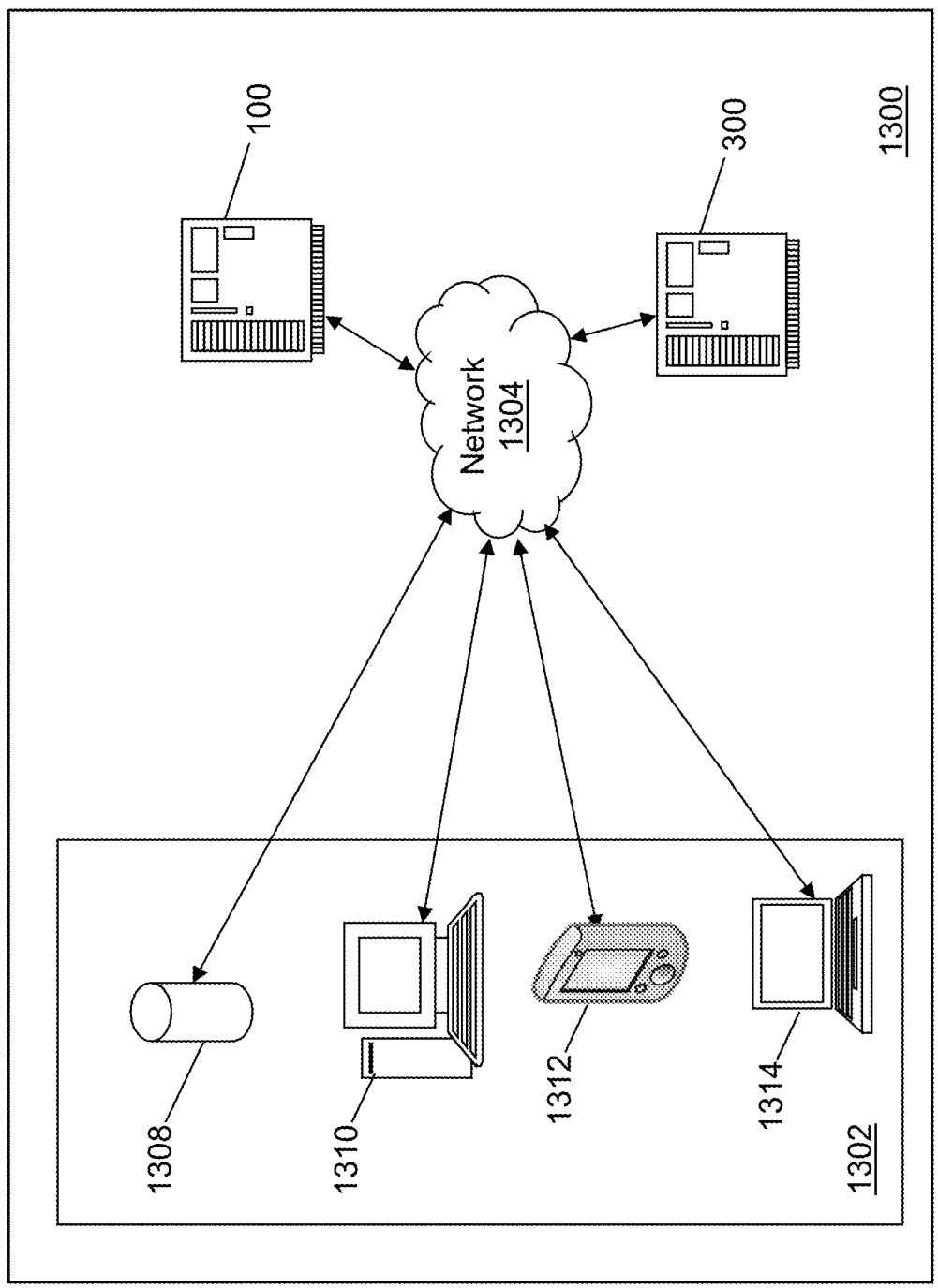
FIG. 13 depicts a block diagram of a conversation processing system in accordance with an illustrative embodiment.

Referring to FIG. 13, a block diagram of a conversation processing system 1300 is shown in accordance with an illustrative embodiment. In an illustrative embodiment, conversation processing system 1300 may include a user system 1302, conversation processing device 100, intent determination device 300, and a network 1304. Each of user system 1302, conversation processing device 100, and intent determination device 300 may be composed of one or more discrete devices in communication through network 1304. User system 1302, conversation processing device 100, and/or intent determination device 300 further may be integrated on the same computing device or different computing devices.

Network 1304 may include one or more networks of the same or different types. Network 1304 can be any type of wired and/or wireless public or private network including a cellular network, a local area network, a wide area network such as the Internet or the World Wide Web, etc. Network 1304 further may comprise sub-networks and consist of any number of communication devices.

The one or more computing devices of user system 1302 may include computing devices of any form factor such as a voice interaction device 1308, a desktop 1310, a smart phone 1312, a laptop 1314, a personal digital assistant, an integrated messaging device, a tablet computer, a point of sale system, a transaction system, etc. User system 1302 can include any number and any combination of form factors of computing devices that may be organized into subnets. The computing devices of user system 1302 send and receive signals through network 1304 to/from another of the one or more computing devices of user system 1302 and/or to/from conversation processing device 100. The one or more computing devices of user system 1302 may communicate using various transmission media that may be wired and/or wireless as understood by those skilled in the art. The one or more computing devices of user system 1302 may be geographically dispersed from each other and/or co-located. Each computing device of the one or more computing devices of user system 1302 may be executing a conversation application 1422 (shown referring to FIG. 14) of the same or different type.

Conversation processing device 100 can include any form factor of computing device. For illustration, FIG. 13 represents conversation processing device 100 as a server computer. In general, a server computer may include faster processors, additional processors, more disk memory, and/or more random-access memory (RAM) than a client computer and support multi-threading as understood by a person of skill in the art. Conversation processing device 100 sends and receives signals through network 1304 to/from user system 1302 and/or to/from intent determination device 300. Conversation processing device 100 may communicate using various transmission media that may be wired and/or wireless as understood by those skilled in the art. Conversation processing device 100 may include a plurality of computing devices of the same or different type that may support failover processing.

Intent determination device 300 can include any form factor of computing device. For illustration, FIG. 13 represents intent determination device 300 as a server computer. Intent determination device 300 sends and receives signals through network 1304 to/from user system 1302 and/or to/from conversation processing device 100. Conversation processing device 100 may communicate using various transmission media that may be wired and/or wireless as understood by those skilled in the art. Conversation processing device 100 may include a plurality of computing devices of the same or different type that may support failover processing.

Figure 14:
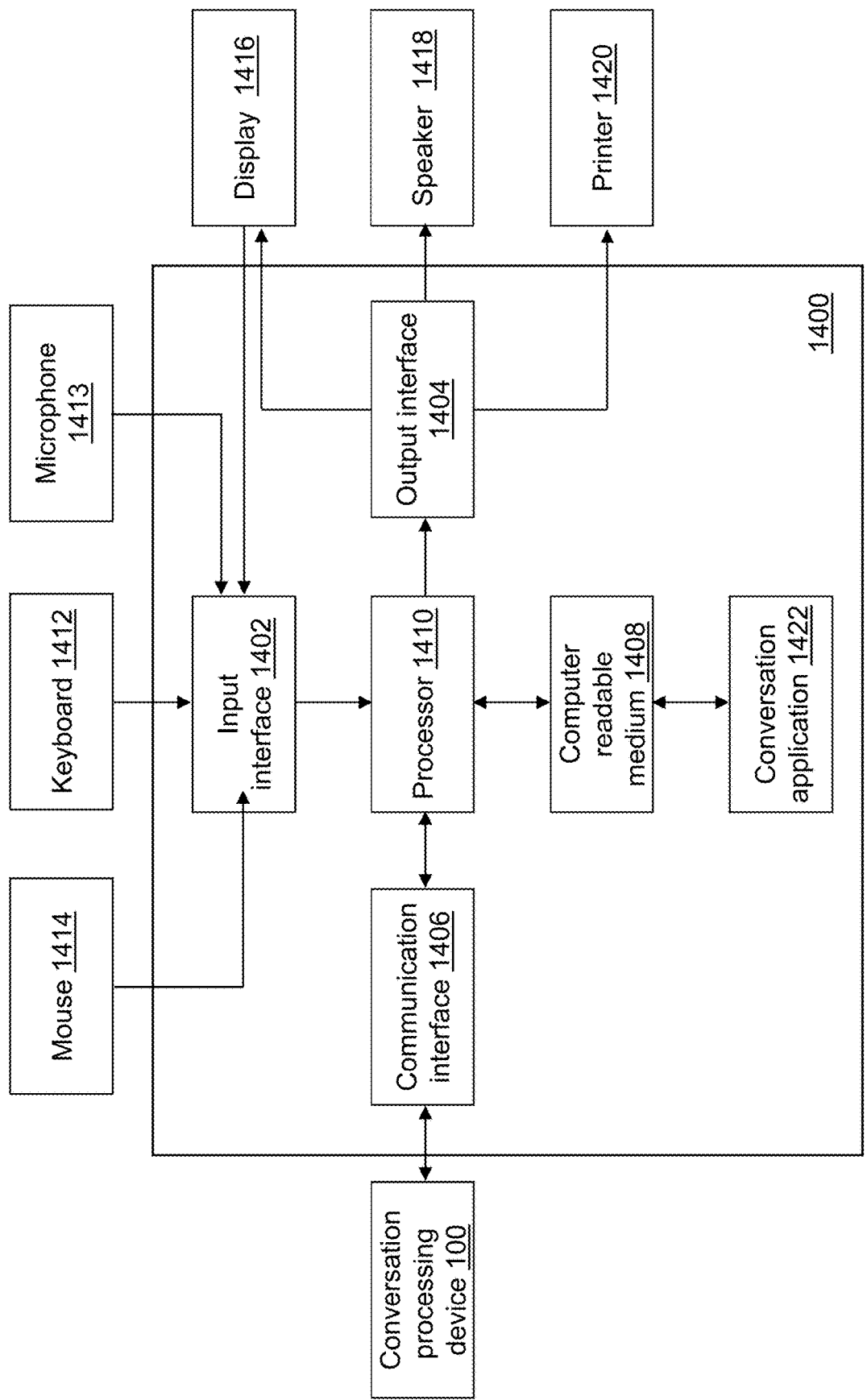
FIG. 14 depicts a block diagram of a conversation device of the conversation processing system of FIG. 13 in accordance with an illustrative embodiment.

Referring to FIG. 14, a block diagram of a conversation device 1400 of user system 1302 is shown in accordance with an example embodiment. Conversation device 1400 is an example computing device of user system 1302. For example, each of voice interaction device 1408, desktop 1410, smart phone 1412, and laptop 1414 may be an instance of conversation device 1400. Conversation device 1400 may include a third input interface 1402, a third output interface 1404, a third communication interface 1406, a third non-transitory computer-readable medium 1408, a third processor 1410, and conversation application 1422. Each conversation device 1400 of user system 1302 may include the same or different components and combinations of components. Fewer, different, and additional components may be incorporated into conversation device 1400.

Third input interface 1402 provides the same or similar functionality as that described with reference to input interface 102 of conversation processing device 100 though referring to conversation device 1400. Third output interface 1404 provides the same or similar functionality as that described with reference to output interface 104 of conversation processing device 100 though referring to conversation device 1400. Third communication interface 1406 provides the same or similar functionality as that described with reference to communication interface 106 of conversation processing device 100 though referring to conversation device 1400. Data and messages may be transferred between conversation device 1400 and conversation processing device 100 using third communication interface 1406. Third computer-readable medium 1408 provides the same or similar functionality as that described with reference to computer-readable medium 108 of conversation processing device 100 though referring to conversation device 1400. Third processor 1410 provides the same or similar functionality as that described with reference to processor 110 of conversation processing device 100 though referring to conversation device 1400.

Conversation application 1422 performs operations associated with receiving a conversation element such as a question, comment, statement, command, etc., for example, from a user, and requesting a response to the conversation element. The conversation element may not be in the form of a question and may be comprised of keywords and/or natural language. The operations may be implemented using hardware, firmware, software, or any combination of these methods. Referring to the example embodiment of FIG. 14, conversation application 1422 is implemented in software (comprised of computer-readable and/or computer-executable instructions) stored in third computer-readable medium 1408 and accessible by third processor 1410 for execution of the instructions that embody the operations of conversation application 1422. Conversation application 1422 may be written using one or more programming languages, assembly languages, scripting languages, etc. Conversation application 1422 may be implemented as a Web application. Conversation application 1422 may be or may be integrated with an existing browser application such as Internet Explorer, Microsoft Edge, Google Chrome, Mozilla Firefox, etc.

Figure 15:
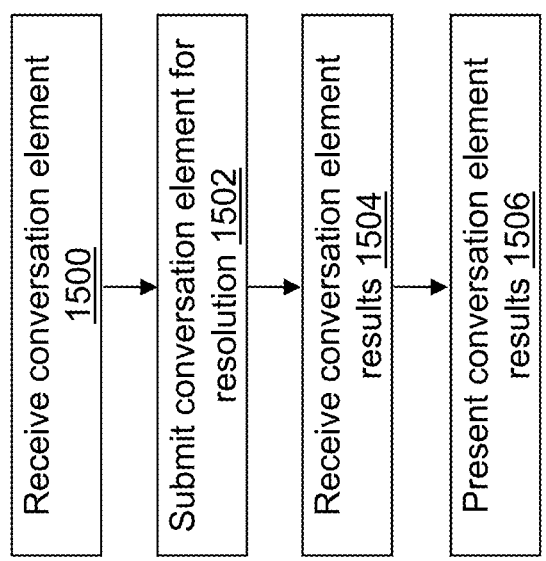
FIG. 15 depicts a flow diagram illustrating examples of operations performed by the conversation device of FIG. 14 in accordance with an illustrative embodiment.

Referring to FIG. 15, example operations associated with conversation application 1422 are described. Additional, fewer, or different operations may be performed depending on the embodiment. The order of presentation of the operations of FIG. 15 is not intended to be limiting. A user can interact with one or more user interface windows presented to the user in third display 1416 under control of conversation application 1422 using second keyboard 1412, second microphone 1413, second mouse 1414, second speaker 1418, etc. independently or through a browser application in an order selectable by the user, and/or the user can interact with control of conversation application 1422 using second microphone 1413 and second speaker 1418 independently or through a browser application in an order selectable by the user. Although some of the operational flows are presented in sequence, the various operations may be performed in various repetitions, concurrently, and/or in other orders than those that are illustrated. For example, a user may execute conversation application 1422, which causes presentation of a first user interface window, which may include a plurality of menus and selectors such as drop-down menus, buttons, text boxes, hyperlinks, etc. associated with conversation application 1422 as understood by a person of skill in the art. As another example, a user may trigger execution of conversation application 1422 by stating a command word associated with conversation application 1422 as understood by a person of skill in the art. Unless off, conversation application 1422 may be continually monitoring sounds received through second speaker 1418. As further understood by a person of skill in the art, various operations may be performed in parallel, for example, using a plurality of threads or a plurality of computing devices such as a grid or a cloud of computing devices.

In an operation 1500, a conversation element is received. For example, the conversation element may be received after entry by a user into a text box or other user interface window presented under control of conversation application 1422 using second keyboard 1412, second mouse 1414, second microphone 1413, etc., after the user speaks to conversation application 1422 using second microphone 1413, etc.

In an operation 1502, the received conversation element is submitted for resolution. For example, the received conversation element is sent to conversation processing device 100 in a request.

In an operation 1504, one or more conversation element results may be received from conversation processing device 100 in a response. The conversation element result may include voice or text. In some cases, the conversation element result may indicate that no response was identified.

In an operation 1506, the received one or more conversation element results are presented to the user. For example, the text may be presented using third display 1416 or a third printer 1420, voice content may be presented using third display 1416 or third printer 1420 after conversion to text or using second speaker 1418, etc.

Implementing some examples of the present disclosure at least in part by using the above-described machine-learning models can reduce the total number of processing iterations, time, memory, electrical power, or any combination of these consumed by a computing device when analyzing data. Some machine-learning approaches may be more efficiently and speedily executed and processed with machine-learning specific processors (e.g., not a generic CPU). For example, some of these processors can include a graphical processing unit, an application-specific integrated circuit, a field-programmable gate array, a Tensor Processing Unit by Google, an Artificial Intelligence accelerator design, and/or some other machine-learning-specific processor that implements one or more neural networks using semiconductor (e.g., silicon, gallium arsenide) devices.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   receive a conversation element;
   determine an intent by matching a domain independent relationship and a domain dependent term determined from the received conversation element to an intent included in an intent database that stores a plurality of intents and by inputting the matched intent into a trained classifier that computes a likelihood that the matched intent is the intent of the received conversation element, wherein matching the domain independent relationship and the domain dependent term determined from the received conversation element to the intent included in the intent database comprises
      determining a plurality of syntactic relationships from the received conversation element;
      mapping the determined syntactic relationships to determine domain independent relationships from the received conversation element using a predefined semantic relationship database and predefined syntactic rules;
      determining domain dependent terms from the received conversation element;
      combining the determined domain independent relationships and the determined domain dependent terms in a graph; and
      identifying an intent from the intent database based on a match with the graph, wherein the intent database includes one or more slots predefined for each intent in a context of a semantic relationship, wherein a domain term is defined for each of the one or more slots;
   determine an action based on the determined intent;
   generate a response to the received conversation element based on the determined action; and
   output the generated response.

2. The non-transitory computer-readable medium of claim 1, wherein before determining the intent, the received conversation element is converted from an audio signal to text.

3. The non-transitory computer-readable medium of claim 2, wherein before outputting the generated response, the generated response is converted from response text to a response audio signal using a speech synthesizer, wherein the response audio signal is the generated response that is output.

4. The non-transitory computer-readable medium of claim 1, wherein the conversation element is received from a second computing device, and the generated response is output to the second computing device.

5. The non-transitory computer-readable medium of claim 1, wherein each syntactic relationship of the plurality of syntactic relationships defines a syntactic structure between a plurality of words included in the received conversation element.

6. The non-transitory computer-readable medium of claim 1, wherein determining the domain dependent terms from the received conversation element comprises submitting the received conversation element to a predefined domain data source that includes terms included in the received conversation element and identifying matching domain terms.

7. The non-transitory computer-readable medium of claim 6, wherein the matching domain terms are identified using a plurality of named entity recognition algorithms.

8. The non-transitory computer-readable medium of claim 1, wherein the graph includes all possible domain dependent semantic relationships.

9. The non-transitory computer-readable medium of claim 1, wherein each node of the graph is a pairing of a text span and a domain term interpretation of the received conversation element.

10. The non-transitory computer-readable medium of claim 9, wherein each edge of the graph connects a pair of the determined domain dependent terms with a single domain independent relationship of the determined domain independent relationships.

11. The non-transitory computer-readable medium of claim 10, wherein each edge of the graph includes a first direction and a role of functor identified for a first domain dependent term of the associated pair of the determined domain dependent terms and a role of argument identified for a second domain dependent term of the associated pair of the determined domain dependent terms, wherein the first direction is from the first domain dependent term to the second domain dependent term.

12. The non-transitory computer-readable medium of claim 11, wherein the graph includes a second edge defined for each edge of the graph in a second direction with the role of functor identified for the second domain dependent term of the associated pair of the determined domain dependent terms and the role of argument identified for the first domain dependent term of the associated pair of the determined domain dependent terms, wherein the second direction is from the second domain dependent term to the first domain dependent term.

13. The non-transitory computer-readable medium of claim 12, wherein, identifying the intent from the intent database based on the match with the graph comprises:
   (A) selecting the intent from the intents database;
   (B) comparing the domain term of each of the one or more slots of the selected intent with each node of the graph;
   (C) when there is a match based on comparing the domain term of each of the one or more slots, comparing the first direction and the second direction of the graph with the semantic relationship of the selected intent;
   (D) when there is a match either with the first direction or the second direction, adding the selected intent to a candidate intent list; and
   (E) repeating (A) to (D) with each remaining intent in the intents database, wherein the candidate intent list includes one or more identified intents.

14. The non-transitory computer-readable medium of claim 13, wherein, inputting the matched intent into a trained classifier comprises after (E):
   extracting a feature from each intent added to the candidate intent list; and
   inputting the extracted feature from each intent into the trained classifier to compute the likelihood score for each intent added to the candidate intent list,
   wherein the determined intent is selected based on the computed likelihood score for each intent added to the candidate intent list.

15. The non-transitory computer-readable medium of claim 14, wherein the feature is at least one of a co-location of a verb and the associated intent, a total number of candidates in the candidate intent list, a number of edges included in the associated intent, and a value of each edge included in the associated intent.

16. The non-transitory computer-readable medium of claim 14, wherein, after computing the likelihood score for each intent added to the candidate intent list determining the intent further comprises:
ordering the candidate intent list based on a highest computed likelihood score to a lowest computed likelihood score,
wherein the determined intent has the highest computed likelihood score.

17. A computing device comprising:
a processor; and
a non-transitory computer-readable medium operably coupled to the processor, the computer-readable medium having computer-readable instructions stored thereon that, when executed by the processor, cause the computing device to
receive a conversation element;
determine an intent by matching a domain independent relationship and a domain dependent term determined from the received conversation element to an intent included in an intent database that stores a plurality of intents and by inputting the matched intent into a trained classifier that computes a likelihood that the matched intent is the intent of the received conversation element, wherein matching the domain independent relationship and the domain dependent term determined from the received conversation element to the intent included in the intent database comprises
determining a plurality of syntactic relationships from the received conversation element;
mapping the determined syntactic relationships to determine domain independent relationships from the received conversation element using a predefined semantic relationship database and predefined syntactic rules;
determining domain dependent terms from the received conversation element;
combining the determined domain independent relationships and the determined domain dependent terms in a graph; and
identifying an intent from the intent database based on a match with the graph, wherein the intent database includes one or more slots predefined for each intent in a context of a semantic relationship, wherein a domain term is defined for each of the one or more slots;
determine an action based on the determined intent;
generate a response to the received conversation element based on the determined action; and
output the generated response.

18. A method of determining user intent from text, the method comprising:
receiving a conversation element;
determining, by a computing device, an intent by matching a domain independent relationship and a domain dependent term determined from the received conversation element to an intent included in an intent database that stores a plurality of intents and by inputting the matched intent into a trained classifier that computes a likelihood that the matched intent is the intent of the received conversation element, wherein matching the domain independent relationship and the domain dependent term determined from the received conversation element to the intent included in the intent database comprises
determining a plurality of syntactic relationships from the received conversation element;
mapping the determined syntactic relationships to determine domain independent relationships from the received conversation element using a predefined semantic relationship database and predefined syntactic rules;
determining domain dependent terms from the received conversation element;
combining the determined domain independent relationships and the determined domain dependent terms in a graph; and
identifying an intent from an intent database based on a match with the graph, wherein the intent database includes one or more slots predefined for each intent in a context of a semantic relationship, wherein a domain term is defined for each of the one or more slots;
determining, by the computing device, an action based on the determined intent;
generating, by the computing device, a response to the received conversation element based on the determined action; and
outputting, by the computing device, the generated response.

19. The method of claim 18, wherein each syntactic relationship of the plurality of syntactic relationships defines a syntactic structure between a plurality of words included in the received conversation element.

20. The method of claim 18, wherein determining the domain dependent terms from the received conversation element comprises submitting the received conversation element to a predefined domain data source that includes terms included in the received conversation element and identifying matching domain terms.

21. The method of claim 18, wherein the graph includes all possible domain dependent semantic relationships.

22. The method of claim 18, wherein each node of the graph is a pairing of a text span and a domain term interpretation of the received conversation element.

23. The method of claim 22, wherein each edge of the graph connects a pair of the determined domain dependent terms with a single domain independent relationship of the determined domain independent relationships.

24. The method of claim 23, wherein each edge of the graph includes a first direction and a role of functor identified for a first domain dependent term of the associated pair of the determined domain dependent terms and a role of argument identified for a second domain dependent term of the associated pair of the determined domain dependent terms, wherein the first direction is from the first domain dependent term to the second domain dependent term.

25. The method of claim 24, wherein the graph includes a second edge defined for each edge of the graph in a second direction with the role of functor identified for the second domain dependent term of the associated pair of the determined domain dependent terms and the role of argument identified for the first domain dependent term of the associated pair of the determined domain dependent terms, wherein the second direction is from the second domain dependent term to the first domain dependent term.

26. The method of claim 25, wherein, identifying the intent from the intent database based on the match with the graph comprises:
(A) selecting the intent from the intents database;
(B) comparing the domain term of each of the one or more slots of the selected intent with each node of the graph;

(C) when there is a match based on comparing the domain term of each of the one or more slots, comparing the first direction and the second direction of the graph with the semantic relationship of the selected intent;

(D) when there is a match either with the first direction or the second direction, adding the selected intent to a candidate intent list; and (E) repeating (A) to (D) with each remaining intent in the intents database, wherein the candidate intent list includes one or more identified intents.

27. The method of claim 26, wherein, inputting the matched intent into a trained classifier comprises after (E):

extracting a feature from each intent added to the candidate intent list; and inputting the extracted feature from each intent into the trained classifier to compute the likelihood score for each intent added to the candidate intent list, wherein the determined intent is selected based on the computed likelihood score for each intent added to the candidate intent list.

28. The method of claim 27, wherein, after computing the likelihood score for each intent added to the candidate intent list determining the intent further comprises:

ordering the candidate intent list based on a highest computed likelihood score to a lowest computed likelihood score, wherein the determined intent has the highest computed likelihood score.

29. The method of claim 27, wherein the feature is at least one of a co-location of a verb and the associated intent, a total number of candidates in the candidate intent list, a number of edges included in the associated intent, and a value of each edge included in the associated intent.

30. The method of claim 18, wherein the matching domain terms are identified using a plurality of named entity recognition algorithms.

* * * * *

UNITED STATES PATENT AND TRADEMARK OFFICE
CERTIFICATE OF CORRECTION

PATENT NO. : 10,559,308 B2
APPLICATION NO. : 16/434210
DATED : February 11, 2020
INVENTOR(S) : Jared Michael Dean Smythe et al.

Page 1 of 1

It is certified that error appears in the above-identified patent and that said Letters Patent is hereby corrected as shown below:

In the Specification

Column 5, Line 1:
Delete the phrase "Base SAS, SAS/STAR)," and replace with --Base SAS, SAS/STAT®,--.

Column 7, Line 60:
Delete the phrase "For illustration, in the line NSUBJ → Doe(NNP)[doe]-" and replace with --For illustration, in the line NSUBJ -> Doe(NNP)[doe]--.

Signed and Sealed this
Twenty-first Day of April, 2020

Andrei Iancu
*Director of the United States Patent and Trademark Office*